United States Patent Office 2,981,761
Patented Apr. 25, 1961

2,981,761
METHOD FOR THE PREPARATION OF FLUOROCARBONS

Mark Wendell Farlow, Wilmington, Del., assignor to E. I. du Pont de Nemours and Company, Wilmington, Del., a corporation of Delaware No Drawing. Filed Oct. 6, 1958, Ser. No. 765,332

20 Claims. (Cl. 260—653.3)

This invention relates to an improved method of synthesizing fluorocarbons, particularly tetrafluoroethylene.

The technical importance of fluorocarbons is constantly increasing. Tetrafluoroethylene in particular is of such high industrial interest that new and improved methods of synthesizing it are actively being sought. A recent technical advance in this field is the discovery that fluorocarbons can be prepared by reacting certain organic or inorganic fluorides with elemental carbon at high temperature, e.g., in a carbon arc, and that tetrafluoroethylene is present in very substantial amounts in the fluorocarbon product when the reaction temperature is high enough (generally above 1500° C.) and the gaseous reaction product is rapidly cooled, preferably to below 500° C., immediately following contact with the hot carbon. These developments have been published in a series of United States patents, principally 2,709,182 issued to M. W. Farlow on May 24, 1955; 2,709,186 to 2,709,191, inclusive, issued to M. W. Farlow et al. on May 24, 1955; 2,709,192 issued to M. W. Farlow on May 24, 1955; 2,725,410 issued to Farlow et al. on November 29, 1955 and 2,732,410–11, issued to Farlow et al. on January 24, 1956.

These high temperature processes constitute a major improvement in the field of fluorocarbon synthesis. However, they are not free of technical difficulties, especially with respect to continuous operation. When elemental carbon is consumed in a continuous process, it must be replaced continuously. This requirement is difficult to meet, particularly when the source of heat is a carbon arc, a preferred embodiment of these processes because of the very high temperatures which are readily attainable by means of an arc. With a carbon arc, some or all of the necessary carbon is supplied by the electrodes themselves, and consumption of carbon from the electrodes presents difficult engineering problems which interfere with continuous operation on a large scale. Even when the operation is carried out in an externally heated reactor, such as a tube of refractory material heated in a suitable furnace, the use of elemental carbon is not entirely satisfactory since the carbon must also be continuously replaced in this type of apparatus. Moreover, contact between the gaseous or vaporized fluoride and the solid carbon may not be adequate, and the operator has little or no control over the proportion of carbon relative to the fluoride at any given moment, and thus is not able to create the most favorable conditions for the information of the desired fluorocarbons.

There was therefore a need for an improvement in the high temperature process of synthesizing fluorocarbons, especially tetrafluoroethylene, from carbon and fluorides, whereby the necessary carbon would not be present in elemental form, but would be supplied instead by an added volatile reactant capable of making intimate contact with the gaseous fluoride in any desired relative proportions.

This invention is a process of preparing fluorocarbons particularly tetrafluoroethylene, by reaction of a fluoride with carbon in a combined form, which comprises heating to a temperature of at least 1500° C. a mixture of (a) a fluoride of a non-metallic element of groups IV, V, VI and VII of the periodic table having an atomic number from 6 to 53, inclusive, and (b) a hydrocarbon boiling below 300° C. at atmospheric pressure, and cooling the gaseous reaction product within not more than one second to a temperature below 500° C.

In this reaction, most or all of the hydrogen that may be present in the system is converted to hydrogen fluoride, thus consuming part of the available fluorine. This side reaction is unavoidable since the carbon-supplying compound contains hydrogen, but it should be minimized to the extent possible. For this reason, as well as for reasons of better operability, the fluoride employed should contain no hydrogen. For the same reason, the hydrocarbon should contain a minimum amount of hydrogen and the reactants should be anhydrous or substantially so.

It should be mentioned in this connection that the hydrogen fluoride which may be formed does not represent a loss of fluorine, since it can readily be recovered as sodium fluoride by scrubbing the gaseous reaction product with aqueous sodium hydroxide or sodium carbonate. The sodium fluoride so obtained is convertible to carbon tetrafluoride in excellent yields by reacting it with carbon and chlorine at a temperature in the range of 1200–1700° C., and the carbon tetrafluoride can be recycled to give tetrafluoroethylene by the process of this invention, or by reaction with hot elemental carbon as disclosed in U.S. Patent 2,709,192 issued May 24, 1955 to M. W. Farlow.

The fluorides suitable for use in this process are the hydrogen-free fluorides of those non-metallic elements of groups IV to VII of the periodic table which have atomic numbers from 6 to 53, inclusive. These non-metallic elements are found in subgroup A of groups IV to VII of the periodic table. Reference is made here to Deming's Periodic Table, as given in Deming's "General Chemistry" (John Wiley & Sons, Inc., 5th ed., pp. 11–13) and in many other reference books such as the Handbook of Chemistry and Physics published by the Chemical Rubber Publishing Co. This table shows that the non-metallic elements are, besides the rare gases, the elements of group VII–A (i.e., the halogens); those in group VI–A having atomic numbers 8 to 52; those in group V–A having atomic numbers 7 to 33; those in group IV–A having atomic numbers 6 to 14; and boron in group III–A. Of these non-metallic elements, those in groups IV to VII which have atomic numbers 6 to 53 (i.e., carbon, silicon, nitrogen, phosphorus, arsenic, oxygen, sulfur, selenium, tellurium, fluorine, chlorine, bromine and iodine) are the elements whose fluorides are operable in this process. Thus, for example, the suitable fluorides include the carbon fluorides (fluorocarbons) free from aliphatic unsaturation, particularly $CF_4$ and $C_2F_6$; the silicon fluorides, particularly $SiF_4$; nitrogen trifluoride, phosphorus pentafluoride, arsenic trifluoride, the sulfur fluorides ($SF_4$ and $SF_6$), fluorine itself, chlorine trifluoride, iodine pentafluoride, etc. Fluorides in which more than one of the above listed elements are combined with the fluorine such as carbonyl fluoride, sulfuryl fluoride and thionyl fluoride, are also suitable.

For reasons of accessibility, ease of handling and good results, the preferred starting materials are elemental fluorine and the binary fluorides of the non-metallic elements in groups IV–A, V–A and VI–A of the periodic table. The most useful and preferred fluorides are the aliphatic, saturated fluorocarbons of one to two carbon atoms (carbon tetrafluoride and hexafluoroethane), silicon tetrafluoride, phosphorus pentafluoride, arsenic trifluoride, sulfur tetrafluoride and sulfur hexafluoride.

The other reactant can be any volatile hydrocarbon, i.e., any hydrocarbon boiling below about 300° C. at atmospheric pressure (760 mm. mercury). It is desirable that the carbon-supplying reactant contain as much carbon as possible, both because a high carbon content favors a higher rae of fluorocarbon formation per unit volume and because the formation of hydrogen fluoride, which consumes part of the available fluorine is thereby minimized. For these reasons, the preferred carbon-supplying reactants are those in which the atomic ratio of carbon to hydrogen is at least 0.3:1, preferably at least 0.5:1. However, hydrocarbons which are poorer in carbon, such as methane, are fully operable and in some cases may be desirable for economic reasons.

Among the suitable hydrocarbons may be mentioned saturated aliphatic hydrocarbons such as methane, ethane, propane, n-hexane, n-octane, commercial mixtures of aliphatic hydrocarbons (e.g., kerosene, gasoline, fuel oils); unsaturated aliphatic hydrocarbons such as ethylene, propene, isobutylene, allene, butadiene-1,3, acetylene, methylacetylene; saturated or unsaturated cyclic hydrocarbons such as cyclohexane, cyclohexene, naphthas, benzene, toluene, and the xylenes, styrene, etc. For reasons of accessibility and economy, the most useful hydrocarbons are those containing from one to eight carbon atoms.

The relative proportions of fluoride and hydrocarbon are not critical. They are important only to the extent that maximum utilization of the fluoride, and at the same time minimum formation of non-fluorocarbon by-products, are desired. In practice, the relative amounts of fluoride and hydrocarbon are chosen so that the atomic ratio of total combined carbon to total fluorine in the reacting system is at least 0.1:1, preferably at least 0.25:1. At the same time, in order to minimize the formation of hydrogen fluoride, it is desirable that the ratio of the total fluorine to the total combined hydrogen in the reacting system be at least 1.5:1, preferably at least 3:1.

Optimum yields of tetrafluoroethylene are generally obtained when the fluoride and a hydrocarbon $C_xH_y$ are employed in such relative proportions that fluorine is present in an amount approximately equal to $2x+y$. Thus, when the reacting system contains only C, F and H, these proportions are established, for example, in the following mixtures:

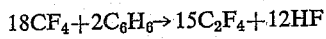

$$18CF_4 + 2C_6H_6 \rightarrow 15C_2F_4 + 12HF$$

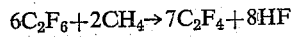

$$6C_2F_6 + 2CH_4 \rightarrow 7C_2F_4 + 8HF$$

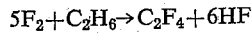

$$5F_2 + C_2H_6 \rightarrow C_2F_4 + 6HF$$

With fluorides of elements other than carbon, optimum results will again be obtained with the same C/H/F ratio, but allowance should be made for the fact that, in some cases, not all the fluorine atoms in the fluoride are equally reactive, i.e., available. Thus, for example, phosphorous pentafluoride contains two especially readily available fluorine atoms, since phosphorus trifluoride is a major product of the reaction, and the optimum C/H/F ratio should be adjusted on the basis of the more readily available fluorine.

However, it is by no means essential to adhere to these theoretically optimum ratios, since considerable deviations from them are permissible. It can be observed as a guide that a deficiency of carbon results in preferential formation of carbon tetrafluoride at the expense of tetrafluoroethylene, while an excess of carbon tends to appear as waste carbon. An excess of hydrogen results in the formation of larger amounts of hydrogen fluoride at the expense of fluorocarbons, while a deficiency of hydrogen favors carbon tetrafluoride formation at the expense of tetrafluoroethylene.

The reaction conditions are essentially those described in the patents already referred to for the synthesis of tetrafluoroethylene. Thus, the reaction temperature should be at least 1500° C., and it can be as high as can be obtained by practical means, for example, in the temperature range of the electric arc, which is estimated to be 2500–4000° C. or even higher.

The absolute pressure of the reactant gases during the pyrolysis is not critical. In general, however, it is much preferred to operate at reduced pressures, which can be as low at 1 mm. of mercury but are desirably in the range of 10–300 mm. of mercury. This is especially desirable when an electric arc is used as the source of heat, since the operation of the arc becomes more difficult with increase in pressure. With other types of reactors, e.g., externally heated tubular reactors, the absolute pressure is also much preferably sub-atmospheric, e.g., in the range of 10–300 mm., but it can be atmospheric or even super-atmospheric.

Practical conversions to tetrafluoroethylene can be obtained only if the product emerging from the hot reaction zone is cooled very rapidly (quenched) to a temperature not exceeding 500° C., preferably of the order of 400° C. or lower. The time required to cool the gaseous reaction product, that is, the time of transition from the reaction temperature to a temperature of about 400–500° C., should not exceed one second. Preferably, it is in the range of 0.001 to 0.1 second. The optimum rate of flow through the hot reaction zone of the gaseous reactants depends in large part on this quenching requirement, that is, on the efficiency of the quenching system. Reduced presures facilities rapid quenching in any given form of apparatus.

The necessary quenching can be achieved in various ways. For example, the off-gas upon leaving the hot reaction zone can be made to pass over the outside wall of a metal vessel containing a coolant material such as water, solid carbon dioxide or liquid nitrogen and located a short distance from the reaction zone, or the off-gas can be passed through a double walled hollow cylinder with or without radial fins, cooled with circulating water. In another modification, the off-gas is carried immediately from the hot zone into a suitably designed quench reactor where it comes in intimate contact with a finely divided (fluidized) solid, which is advantageously carbon.

Apparatus of any suitable design can be used to carry out the process of this invention. For example, the reactor can be a tube of refractory material, if desired packed with particles of an appropriate infusible substance to improve contact between the reactants, through which is passed a mixture in the desired proportions of the gaseous or vaporized fluoride and hydrocarbon. The tube is heated to at least 1500° C. in a resistance furnace or induction furnace, and appropriate means are provided to quench the off-gas and collect the reaction products. In this type of equipment, however, in view of the corrosive nature of many fluorides and reaction products at the high temperatures involved, it is often desirable to use carbon or graphite as the material of construction for the hot parts of the reactor and as the contact masses. Some of this carbon participates in the reactiin, in spite of the fact that most of the carbon will be furnished by the added volatile hydrocarbon. Thus, while the use of a carbon-supplying reactant is advantagtous even in an apparatus made of, or containing carbon, the full advantages of this process are not realized in such a case.

A preferred device for carrying out the process is the electric arc, which produces extremely high temperatures. In this type of apparatus, the electrodes can be made of a heat- and corrosion-resistant metal, such as copper or tungsten, thereby contributing no carbon to the reaction. In addition, metal electrodes can be kept relatively cool through internal circulation of a cooling liquid, and under such conditions they remain substantially unattacked for considerable periods of time. Carbon electrodes are also entirely suitable, and a carbon arc can be used even without special provisions for preventing or decreasing electrode consumption, since even in such a case a very substantial amount of the necessary carbon is supplied by the added hydrocarbon rather than by the electrodes. However, here again the full advantages of the process are realized only when essentially non-consumable carbon electrodes are used. A carbon anode can be made essentially non-consumable by maintaining it at a relatively low temperature, in practice below about 1500° C. This can be accomplished by using a relatively thin anode supported by, and in intimate contact with, a water-cooled metallic holder, this device providing very efficient external cooling of the carbon anode. In a low tension arc the cathode cannot be similarly cooled since its temperature must be high enough to sustain thermal emission of electrons, but the cathode normally furnishes little or no carbon. With a cool anode, a carbon electrode system loses substantially no carbon, as can be demonstrated by weighing the electrodes before and after operating the arc.

Improved forms of carbon arc, well adapted to the synthesis of fluorocarbons, are described in the aforementioned U.S. Patent 2,709,192 and in other patents. These are suitable for use in the present process, with such appropriate modifications as may be required for the cooling of the electrodes, if this is desired, and for the introduction of the carbon-supplying reactant. The latter is preferably introduced in the gaseous or vaporized form, if desired premixed with the gaseous or vaporized fluoride in the desired proportions, but it can also be delivered as a liquid or even as a solid into the reactor, where it vaporizes before entering the arc zone. A substantially inert carrier gas such as nitrogen or helium can be used if desired.

An especially suitable type of electric arc for use in this process is a magnetically rotated arc. In comparison with static arcs of conventional design or even with the improved arcs of the kind mentioned above, a rotating arc is far more efficient by virtue of its much greater stability and of the far better contact between arc and reactants that it permits. The examples which follow were carried out using an arc of this type.

A particularly efficient type of rotating carbon arc operates as follows: The reactants (in this case, the hydrocarbon and the fluoride) pass through a symmetrical annular gap formed by a substantially cylindrical solid graphite cathode and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gauss. The arc rotates extremely rapidly in the annular gap between the electrodes, its speed being estimated at 1000–10,000 revolutions per second, and it heats the reactants very uniformly to extremely high temperatures as they pass through the gap. The gaseous reaction product leaves the arc chamber through the hollow anode and is immediately cooled by contact with cold portions of the apparatus or with a specially designed quenching unit.

The electrical characteristics of the rotating arc are essentially similar to those of the static arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 500 amperes are generally used.

As in the already described synthesis of tetrafluoroethylene from elemental carbon, the reaction in this process normally gives a mixture of fluorocarbons, the preponderant constituents of which are carbon tetrafluoride and tetrafluoroethylene, with in general lesser amounts of hexafluoroethane, and sometimes still lesser amounts of other saturated or unsaturated fluorocarbons. The crude reaction product may also contain some unreacted fluoride, which can be recycled, and the free element whose fluoride was employed, or compounds thereof. As already mentioned, the reaction product will contain hydrogen fluoride, which can be recovered as sodium fluoride by scrubbing the reaction product with aqueous sodium hydroxide, the sodium fluoride in turn being readily convertible to carbon tetrafluoride in excellent yields. Another method of removing the hydrogen fluoride consists in bringing the reaction product in contact with an alkali metal fluoride such as sodium fluoride which absorbs hydrogen fluoride with formation of a non-volatile acid fluoride.

With or without prior removal of the hydrogen fluoride and any other alkali-soluble products which may be present, the fluorocarbons can be isolated by passing the gaseous reaction product through cold condensers and fractionating the condensate through efficient distilling columns. In this way, tetrafluoroethylene can be readily separated from carbon tetrafluoride. Its separation from hexafluoroethane requires more efficient fractionation, or it can be carried out by selective solvent extraction or by selective absorption on solids. However, in most cases it is not at all essential for the tetrafluoroethylene to be completely free of hexafluoroethane.

The fluorocarbons other than tetrafluoroethylene which are produced in the process can be used as such (carbon tetrafluoride, for example, is a useful chemical) or they can be in turn converted to tetrafluoroethylene by reaction with hot carbon in accordance with the published methods, or recycled in the process of this invention.

The following examples illustrate the invention in greater detail.

*Example I*

A gaseous mixture of carbon tetrafluoride and benzene in the molar ratio $CF_4:C_6H_6$ of 9:1 was passed through a magnetically rotated carbon arc at an absolute pressure within the arc chamber of 20 mm. of mercury. The cathode was a graphite rod, $3/16''$ in diameter, and the anode was a hollow graphite cylinder having an internal diameter of 0.5″, mounted on a water-cooled ring-shaped copper holder which served to keep the anode cool. The arc was operated at 30 volts and 40–50 amperes. The reactant gases, after passing through the arc flame in the annular space between the electrodes, left the hot reaction zone through the hollow anode and impinged on a water-cooled copper surface about one inch downstream from the arc zone, where the gaseous reaction product was quenched to below 500° C. within a few microseconds following contact with the arc flame.

The reaction product, formed at the rate of about 31 g. per hour, was then led into a copper trap cooled in liquid nitrogen, where it condensed. The trap contained sodium fluoride which served to absorb the hydrogen fluoride by reacting with it to form the non-volatile sodium acid fluoride. The volatile, hydrogen fluoride-free reaction product was found by mass spectroscopy analysis to contain, on a molar basis, 46% of tetrafluoroethylene, 43% of carbon tetrafluoride, 7% of hexafluoroethane and small amounts of fluorocarbons containing 3 or more carbon atoms per molecule. Analysis of the non-volatile sodium fluoride-sodium acid fluoride mixture for hydrogen ion showed that hydrogen fluoride had been produced at the rate of about 4.4 g./hr. Examination of the graphite anode after the operation showed that it was virtually unchanged in shape or size and that its weight had diminished by less than 0.1 g./hr. of operation. This showed that practically all of the necessary carbon had been supplied by the benzene.

*Example II*

Using the apparatus and procedure of Example I, a gaseous mixture of carbon tetrafluoride and methane in the molar ratio $CF_4:CH_4$ of 3:1 was passed through the arc at such a rate that 38 g. of reaction product was formed per hour. The product, after removal of the hydrogen fluoride, was found to contain on a molar basis 52% of tetrafluoroethylene, 32% of carbon tetrafluoride, 11% of hexafluoroethane and small percentages of higher fluorocarbons.

*Example III*

Using the apparatus and procedure of Example I, a mixture of carbon tetrafluoride and acetylene in the molar ratio $CF_4:C_2H_2$ of 3:1 was passed through the arc at such a rate that 31 g. of product was formed per hour. After removal of the hydrogen fluoride, the product was found to contain on a molar basis 65% of tetrafluoroethylene, 22% of carbon tetrafluoride, 7% of hexafluoroethane, and small percentages of higher fluorocarbons.

*Example IV*

Using the apparatus and procedure of Example I, except that the arc had a water-cooled copper anode instead of a graphite anode and the pressure within the arc chamber was 30 mm. of mercury, a mixture of phosphorus pentafluoride and 1,3-butadiene in the molar ratio $PF_5:C_4H_6$ of 7:1 was passed through the arc. The flow rate was such that there was formed 84 g. of reaction product per hour. The product, after washing with aqueous alkali to remove hydrogen fluoride, phosphorus trifluoride and other alkali-soluble materials, was found to consist chiefly of tetrafluoroethylene and carbon tetrafluoride. The carbon cathode was found to have lost no weight during this operation, showing that all of the necessary carbon had been supplied by the butadiene.

It is to be understood that the foregoing examples are merely illustrative of the invention described and are not intended to limit the invention. In essentially the same way and giving rise to the same fluorocarbon reaction products there may be used hexafluoroethane, silicon tetrafluoride, sulfur tetrafluoride, sulfur hexafluoride, fluorine, chlorine trifluoride, arsenic trifluoride or nitrogen trifluoride as the fluoride component in combination with such hydrocarbons as ethylene, propane, allene, methylacetylene, toluene or styrene as the carbon supplying coreactant.

I claim:

1. A process for the preparation of fluorocarbons which comprises heating to a temperature of at least 1500° C. a mixture of (a) a fluoride of a non-metallic element of groups IV to VII of the periodic table having an atomic number from 6 to 53, inclusive, and (b) a hydrocarbon boiling below 300° C. at atmospheric pressure, and cooling the gaseous reaction product to a temperature below 500° C. in less than one second.

2. A process for the preparation of fluorocarbons which comprises heating to a temperature of at least 1500° C. a mixture of (a) a fluoride of a non-metallic element of group IV of the periodic table having an atomic number of 6 to 14 inclusive, and (b) a hydrocarbon boiling below 300° C. at atmospheric pressure, and cooling the gaseous reaction product to a temperature below 500° C. in less than one second.

3. The process as set forth in claim 2 wherein the non-metallic element is carbon.

4. The process as set forth in claim 3 wherein the carbon fluoride is carbon tetrafluoride.

5. The process as set forth in claim 3 wherein the carbon fluoride is hexafluoroethane.

6. The process as set forth in claim 2 wherein the element is silicon.

7. A process for the preparation of fluorocarbons which comprises heating to a temperature of at least 1500° C. a mixture of (a) a fluoride of a non-metallic element of group V of the periodic table having an atomic number of 7 to 33, inclusive, and (b) a hydrocarbon boiling below 300° C. at atmospheric pressure, and cooling the gaseous reaction product to a temperature below 500° C. in less than one second.

8. The process as set forth in claim 7 wherein the non-metallic element is nitrogen.

9. The process as set forth in claim 7 wherein the non-metallic element is arsenic.

10. The process as set forth in claim 7 wherein the non-metallic element is phosphorus.

11. The process as set forth in claim 10 wherein the phosphorus fluoride is phosphorus pentafluoride.

12. A process for the preparation of fluorocarbons which comprises heating to a temperature of at least 1500° C. a mixture of (a) a fluoride of a non-metallic element of group VI of the periodic table having an atomic number of 8 to 52, inclusive, and (b) a hydrocarbon boiling below 300° C. at atmospheric pressure, and cooling the gaseous reaction product to a temperature below 500° C. in less than one second.

13. The process as set forth in claim 12 wherein the non-metallic element is sulfur.

14. A process for the preparation of fluorocarbons which comprises heating to a temperature of at least 1500° C. a mixture of (a) a fluoride of a non-metallic element of group VII of the periodic table having an atomic number of 9 to 53, inclusive, and (b) a hydrocarbon boiling below 300° C. at atmospheric pressure, and cooling the gaseous reaction product to a temperature below 500° C. in less than one second.

15. The process as set forth in claim 14 wherein the fluoride of a non-metallic element is fluorine.

16. A process for the preparation of tetrafluoroethylene which comprises passing through an electric carbon arc a mixture of (a) a fluoride of a non-metallic element of group IV to VII of the periodic table having an atomic number of 6 to 53, inclusive, and (b) a hydrocarbon having from 1 to 8 carbons, and cooling the gaseous reaction products to below 500° C. in less than one second.

17. The process as set forth in claim 16 wherein the arc employed is a magnetically rotated arc.

18. The process as set forth in claim 16 wherein the hydrocarbon is methane.

19. The process as set forth in claim 16 wherein the hydrocarbon is acetylene.

20. The process as set forth in claim 16 wherein the hydrocarbon is benzene.

References Cited in the file of this patent

UNITED STATES PATENTS

| | | |
|---|---|---|
| 2,709,186 | Farlow et al. | May 24, 1955 |
| 2,732,410 | Farlow et al. | Jan. 24, 1956 |
| 2,732,411 | Farlow et al. | Jan. 24, 1956 |
| 2,759,026 | McCleary | Aug. 14, 1956 |